United States Patent Office 3,086,953
Patented Apr. 23, 1963

3,086,953
SILICONE TREATMENT OF MASONRY
Siegfried Nitzsche and Ewald Pirson, Burghausen, Germany, assignors to Wacker-Chemie G.m.b.H., Munich, Germany
No Drawing. Filed July 18, 1960, Ser. No. 43,306
6 Claims. (Cl. 260—37)

This invention relates to treatment of masonry materials to impart water repellency thereto.

It is known that alkali metal methylsiliconates such as sodium methyl siliconate, in solid form or dissolved in water or other solvent, can be employed to render masonry water repellent. The water repellency developed with the alkali metal siliconates has been excellent but certain disadvantages have been encountered. For example, when sodium methyl siliconate is added to mortar or cement, the colloidal system will be altered and disturbed as manifested by the great change in viscosity noted in the cement mixture. Furthermore, the pulverulent sodium methyl siliconates have been found to be irritating to nose and throat hence it is unpleasant and perhaps unhealthy to work with powdered alkali metal methyl siliconates.

Solid methyl polysiloxane resins have been employed as additives to masonry materials to improve the water repellency of such materials. The siloxanes, however, suffer by comparison to alkali metal methyl siliconates because larger proportions of the siloxanes are required to achieve equivalent water repellency. Furthermore, the siloxanes are generally only difficultly soluble in the normally alkaline mediums encountered in mortars, cements and other masonry materials.

It is the primary object of this invention to introduce a novel water repellent additive for masonry materials. A further object is a water repellent additive which is particularly effective with masonry mixtures showing an alkaline reaction as mixed. Another object is preparation of hydraulically hardening materials and calciferous materials exhibiting water repellency. Other objects and advantages achieved through this invention are disclosed or will be apparent in this specification and appended claims.

This invention is the method of improving the water repellency of masonry materials by incorporating therein a pulverulent monoalkylsiloxane polymer containing units of the formula RHSiO, where R is an alkyl radical.

The siloxanes containing units wherein hydrogen is bonded directly to silicon have been found to be easily and uniformly dispersed in pulverulent form throughout the raw masonry materials. The hydrogen is liberated from the polymer molecule by the alkali reactants present in the masonry mixtures such as mortar, cement and lime containing materials. This results in immediate reaction between siloxane polymer molecules and other materials in the mix and consequently thorough dispersion and solution is achieved. The results achieved are rapid and superior to those heretofore obtained and very small proportions of siloxane are required. Thus 0.05% of H—Si containing siloxane polymer in a plaster mix will give the same degree of water repellency as achieved with 1% of either methylsiloxane free of HSi or alkali metal siliconates free of HSi.

The siloxane polymers employed herein are copolymeric materials consisting essentially of $RSiO_{3/2}$ units and RHSiO units. Limited quantities of $R_2SiO$ units, $R_3SiO_{1/2}$ units and/or $SiO_2$ units can be present in the polymer but it is preferred to have an R/Si ratio of from 0.9/1 to 1.1/1. In the formulae, R represents an alkyl radical such as methyl, ethyl, propyl, butyl, amyl and octadecyl. The preferred polymers are methyl siloxanes. The RHSiO units should comprise 1 to 70 mol percent, preferably 5 to 30 mol percent, of the siloxane units present.

The operative siloxane polymers are dry, particulated materials and are prepared by known methods involving hydrolysis and condensation of mixtures of hydrolyzable alkylsilanes wherein the principal constituents are $RSiX_3$ and $RHSiX_2$ where X is a hydrolyzable group such as halogen atoms and/or alkoxy radicals. A single copolymer or mixtures of copolymers can be employed. It is advantageous to hydrolyze mixtures of $CH_3SiCl_3$ and $CH_3SiHCl_2$ obtained from the direct synthesis of chlorosilanes through reaction of methylchloride with silicon. The raw mixture of $CH_3SiCl_3$ and $CH_3SiHCl_2$ need not be fractionated in order to obtain pure silane species as is required when methyltrichlorosilane is employed to prepare water repellent additives for masonry materials. In short, relatively crude mixtures of methyltrichlorosilane, methylhydrogendichlorosilane with up to 10 mol percent silicon tetrachloride and/or $HSiCl_3$, can be hydrolyzed without further separation or purification to produce the siloxanes employed herein.

The hydrolysis and condensation reactions can be carried out in the presence of fine particle silica as set forth in the copending application Serial No. 42,504, filed July 13, 1960, entitled "Method of Hydrolyzing Chlorosilanes," filed by S. Nitzsche and E. Pirson (cf. German patent application W 26,022, filed July 16, 1959). For example, a mixture of 70 mol percent $CH_3SiCl_3$ and 30 mol percent $CH_3SiHCl_2$ is hydrolyzed in an excess of water containing 10% by weight based on the weight of chlorosilanes, of fume silica having an average particle size of 15 millimicrons. The fine powder thus produced is an excellent hydrophobizing agent in cements and plasters.

The pulverulent copolymeric siloxanes containing RHSiO units are as stable as the methylsiloxanes free of $HSi\equiv$ groups and can be employed without further treatment. They are added to the dry masonry mixtures. The described copolymers are effective in proportions from .05 to 5% by weight based on the dry weight of the mixture. The desired hydrophobing effect is realized with mortar, concrete, lime coatings, stuccos, cementitious material, brick mixes, concrete and cement block mixes, brickcrete mixes, and a host of masonry species and types. Of particular interest are the calciferous mixtures which harden substantially only when air is admitted through the influence of $CO_2$.

The following examples are included herein to aid those skilled in the art to understand and practice the invention. The scope of the invention is delineated in the appended claims and is not restricted by the examples. All parts and percentages in the examples are based on weight.

*Example 1*

Lime mortar composed of 1 part white lime and 2.5 parts sand is employed herein. A powdered methylsiloxane copolymer of 80 mol percent $CH_3SiO_{3/2}$ units and 20 mol percent $CH_3SiHO$ units was added to separate portions of the lime mortar to give mortar mixes containing .06% siloxane, .15% siloxane, .3% siloxane, .6% siloxane and a control containing no siloxane. The mortar mixes were added to water and thoroughly mixed and permitted to dry to a hard mortar product. The control mix without siloxane was not water repellent. Water repellency was evident in the mortar containing .06% siloxane and the water repellency property increased and water absorbing decreased with the increasing amounts of siloxane. Thus the mortar containing 0.6% siloxane was very water repellent and absorbed practically no water even when immersed in water.

Example 2

A mixture was prepared from 100 kg. Portland cement, 300 kg. dried sand and 2 kg. of a powdered copolymeric siloxane containing 80 mol percent $CH_3SiO_{3/2}$ units, 13 mol percent $CH_3SiHO$ units and 7 mol percent $SiO_{4/2}$ units. The components were combined dry in a mixer and thereafter processed into a cement mixture by adding water to the mixture. A cement slab prepared from the mixture displayed excellent water repellency as shown by the contact angle of water droplets on the cement surface and by the water absorbency of the cement.

Example 3

A plaster coating material was prepared by mixing 50 parts white lime, 3 parts chrome oxide and 2 parts casein. Half of the dry mix was thoroughly mixed with about .5% of the siloxane copolymer employed in Example 1 while the other half of the dry mix was employed as a control. The dry mixes were mixed with water and employed as plaster on different portions of a wall. The plaster coating prepared from the mix containing siloxane was water repellent and resisted staining by waterborne materials. The control plaster did not develop water repellency and remained water absorbent even after complete hardening.

Example 4

When Example 2 was repeated with the following copolymers in place of the copolymer of $CH_3SiO_{3/2}$, $CH_3SiHO$ and $SiO_{4/2}$, equivalent results were achieved:

[A] 80 mol percent $C_2H_5SiO_{3/2}$, 15 mol percent $C_2H_5SiHO$, 5 mol percent $SiO_{4/2}$;

[B] 60 mol percent $C_4H_9SiO_{3/2}$, 40 mol percent $C_2H_5SiHO$;

[C] 35 mol percent $CH_3SiO_{3/2}$, 65 mol percent $CH_3SiHO$;

[D] 20 mol percent $CH_3SiO_{3/2}$, 30 mol percent $C_2H_5SiO_{3/2}$, 20 mol percent $C_5H_{11}SiO_{3/2}$, 30 mol percent $C_2H_5SiHO$.

That which is claimed is:

1. A method for imparting water repellency to masonry materials consisting of incorporating into the masonry mixture a dry, pulverulent organosiloxane copolymer consisting essentially of 30 to 99% inclusive of units of the formula $RSiO_{3/2}$, 1 to 70% inclusive of units of the formula $RHSiO$, and up to 10% of units of the formula $SiO_{4/2}$, wherein each R is an alkyl radical.

2. The method of claim 1 wherein the masonry mix shows an alkaline reaction when mixed with water.

3. The method of claim 1 wherein each R is a methyl radical.

4. The method of claim 1 wherein the organosiloxane copolymer consists essentially of 70 to 95% of $RSiO_{3/2}$ units, 5 to 30% of $RHSiO$ units and up to 10% of $SiO_{4/2}$ units where R is an alkyl radical.

5. The method of claim 4 wherein the masonry is a hydraulically hardening material.

6. The method of claim 4 wherein the masonry is a calciferous mixture.

References Cited in the file of this patent

UNITED STATES PATENTS

| | | |
|---|---|---|
| 2,491,487 | Faulwetter | Dec. 20, 1949 |
| 2,873,265 | Rust | Feb. 10, 1959 |

FOREIGN PATENTS

| | | |
|---|---|---|
| 1,080,589 | France | June 2, 1954 |
| 1,207,978 | France | Sept. 7, 1959 |